US008783345B2

(12) United States Patent
Babcock et al.

(10) Patent No.: US 8,783,345 B2
(45) Date of Patent: Jul. 22, 2014

(54) MICROBIAL ENHANCED OIL RECOVERY DELIVERY SYSTEMS AND METHODS

(75) Inventors: John Babcock, Houston, TX (US); Bud Bierhaus, Katy, TX (US); Mark Mayfield, Houston, TX (US); Thomas Ishoey, Houston, TX (US)

(73) Assignee: Glori Energy Inc., Houston, TX (US)

( * ) Notice: Subject to any disclaimer, the term of this patent is extended or adjusted under 35 U.S.C. 154(b) by 564 days.

(21) Appl. No.: 13/166,382

(22) Filed: Jun. 22, 2011

(65) Prior Publication Data

US 2012/0325457 A1  Dec. 27, 2012

(51) Int. Cl.
*E21B 43/22* (2006.01)
*E21B 43/00* (2006.01)
*C09K 8/582* (2006.01)
*E21B 43/16* (2006.01)

(52) U.S. Cl.
CPC ............... *E21B 43/16* (2013.01); *C09K 8/582* (2013.01)
USPC .......................................... 166/246; 166/265

(58) Field of Classification Search
None
See application file for complete search history.

(56) References Cited

U.S. PATENT DOCUMENTS

| | | | | |
|---|---|---|---|---|
| 2,738,325 | A | * | 3/1956 | Rydell ............................ 166/275 |
| 3,332,487 | A | * | 7/1967 | Jones ............................. 166/246 |
| 4,408,664 | A | | 10/1983 | Santee |
| 4,446,919 | A | | 5/1984 | Hitzman |
| 4,450,908 | A | | 5/1984 | Hitzman |
| 4,475,590 | A | | 10/1984 | Brown |
| 4,505,155 | A | * | 3/1985 | Jackson ...................... 73/152.51 |
| 4,659,463 | A | | 4/1987 | Chandler et al. |
| 4,678,033 | A | | 7/1987 | Killough |
| 4,799,545 | A | | 1/1989 | Silver et al. |
| 4,905,761 | A | | 3/1990 | Bryant |
| 4,971,151 | A | | 11/1990 | Sheehy |
| 5,083,611 | A | | 1/1992 | Clark et al. |
| 5,163,510 | A | | 11/1992 | Sunde |
| 5,327,967 | A | | 7/1994 | Jenneman et al. |
| 5,341,875 | A | | 8/1994 | Jenneman et al. |
| 5,360,064 | A | | 11/1994 | Jenneman et al. |
| 5,363,913 | A | | 11/1994 | Jenneman et al. |
| 5,368,099 | A | | 11/1994 | Davey et al. |
| 5,570,973 | A | | 11/1996 | Hunt |
| 5,628,364 | A | | 5/1997 | Trenz |

(Continued)

FOREIGN PATENT DOCUMENTS

CN  201043460  5/2007
CN  101988380  8/2010

OTHER PUBLICATIONS

International Search Report and Written Opinion issued for PCT/US2012/041914, dated Aug. 16, 2012, 11 pages.

(Continued)

*Primary Examiner* — Angela M DiTrani
*Assistant Examiner* — Anuradha Ahuja
(74) *Attorney, Agent, or Firm* — Fulbright & Jaworski LLP (57) ABSTRACT

A method of microbial enhanced oil recovery from a wellbore in an oil-bearing formation that includes injecting water into the oil-bearing formation via a tubing string in the wellbore and introducing oxygen into the oil-bearing formation for consumption by microbes in the oil-bearing formation. The oxygen introduction includes delivering the oxygen into the oil-bearing formation without having the introduced oxygen contact the walls of the tubing string and without having the introduced oxygen contact the injected water within the tubing string while the injected water is in the tubing string.

35 Claims, 5 Drawing Sheets

(56) References Cited

U.S. PATENT DOCUMENTS

| | | | |
|---|---|---|---|
| 5,690,173 A * | 11/1997 | Abdul et al. | 166/268 |
| 5,723,781 A * | 3/1998 | Pruett et al. | 73/152.18 |
| 5,888,021 A | 3/1999 | Kawabata | |
| 6,015,015 A * | 1/2000 | Luft et al. | 166/384 |
| 6,543,535 B2 * | 4/2003 | Converse et al. | 166/246 |
| 6,546,962 B1 * | 4/2003 | Sunde | 137/893 |
| 6,758,270 B1 | 7/2004 | Sunde et al. | |
| 6,916,136 B2 * | 7/2005 | Layton et al. | 405/129.95 |
| 7,082,996 B2 | 8/2006 | Smith et al. | |
| 7,124,817 B1 | 10/2006 | Sunde | |
| 7,219,742 B2 | 5/2007 | Smith et al. | |
| 7,311,144 B2 | 12/2007 | Conrad | |
| 7,325,603 B2 | 2/2008 | Kotlar et al. | |
| 7,407,583 B2 | 8/2008 | Mailath et al. | |
| 7,472,747 B1 | 1/2009 | Brigmon et al. | |
| 7,708,075 B2 | 5/2010 | Lake et al. | |
| 2001/0045279 A1 * | 11/2001 | Converse et al. | 166/246 |
| 2003/0155156 A1 * | 8/2003 | Livingstone | 175/57 |
| 2004/0244969 A1 | 12/2004 | Kotlar et al. | |
| 2006/0194700 A1 * | 8/2006 | Gatlin et al. | 507/140 |
| 2007/0092930 A1 | 4/2007 | Lal et al. | |
| 2007/0102359 A1 * | 5/2007 | Lombardi et al. | 210/639 |
| 2008/0169106 A1 | 7/2008 | Hill et al. | |
| 2008/0236815 A1 * | 10/2008 | Hinds et al. | 166/250.01 |
| 2009/0107683 A1 * | 4/2009 | Lake et al. | 166/375 |
| 2010/0044031 A1 | 2/2010 | Fallon et al. | |
| 2010/0276146 A1 | 11/2010 | Smith | |
| 2011/0067856 A1 | 3/2011 | Kohr | |
| 2012/0261117 A1 * | 10/2012 | Pavia et al. | 166/246 |

OTHER PUBLICATIONS

Basset, M. G., et al., "WEMCO Depurator™ System," Society of Petroleum Engineers of AIME, Paper No. SPE 3349, 1971, American Institute of Mining, Metallurgical, and Petroleum Engineers, Inc., 8 pages.

* cited by examiner

MICROBIAL ENHANCED OIL RECOVERY DELIVERY SYSTEMS AND METHODS

TECHNICAL FIELD

The current invention generally relates to the application of a process to enhance the production of oil from oilfields after primary recovery. More particularly, the current invention relates to delivery systems and methods for microbial enhanced oil recovery.

BACKGROUND OF THE INVENTION

Microbial enhanced oil recovery (MEOR) involves the use of microorganisms growing in-situ in an oil-bearing formation to facilitate either the production of materials to aid oil recovery or implementing a mechanism for oil recovery. Typically, the MEOR process is deployed as a supplement to the process of waterflooding which involves injecting water into the oil-bearing formation via a wellbore and recovering oil from a production well. The water used for injection is usually extracted from the oil-bearing formation as part of the oil production process or from other water bearing formations. The MEOR process is applied to waterfloods as a form of enhanced oil recovery (EOR) where microbes are introduced into the injection water via a line on the low pressure side of a pump that pumps the injection water from a holding tank into the oil-bearing formation. The inoculation process is typically a one-event process for each well and involves injecting several hundred liters of microbial consortia in the line on the low pressure side of the water injection pump.

Nutrients are also introduced into the injection water. The nutrients are introduced to enable the microbial activity in the oil-bearing formation. The nutrients may be introduced in the injection water when the injection water is in the holding tank. Alternatively, the nutrients may be introduced into the injection water via a line on the low pressure side of the water injection pump.

In addition to nutrients and depending on the type of microbes deployed, it may be necessary to introduce oxygen to support the MEOR process as some microbes use oxygen for certain microbial processes. The introduction of oxygen into the injection water is typically done by natural aspiration, which involves continuous exposure of the injection water to the atmosphere when the injection water is in the holding tank. The continuous exposure of the injection water to the atmosphere causes oxygen to be absorbed in the injection water. The absorption process reaches equilibrium when the concentration of oxygen in water is about 8 to 11 parts per million. Another method of introducing air into the injection water is to compress air into a line on the low or high pressure side of the pump that pumps the injection water from the holding tank into the oil-bearing formation. The holding tanks are usually closed so that exposure of the water to oxygen is restricted to minimize precipitation and potential corrosion as discussed below.

The injection water, containing nutrients and dissolved oxygen, is pumped to the wellhead, down the wellbore and into the oil-bearing formation. The presence of oxygen in the injection water, however, can cause corrosion (rusting) of tanks, pumps, flowlines and wellbore tubulars, which are all normally made of carbon steel. This is particularly problematic if the injection water has high salinity (high salt content). Solutions to this problem include the use of chemical inhibitors to prevent the corrosion or replacement of carbon steel equipment with stainless steel, fiberglass, plastic or epoxy resin coated materials to avoid corrosion and corrosion related equipment failures caused by the dissolved oxygen in the injection water. Chemical inhibitors can interfere with the MEOR process by altering microbial activity and for these systems replacement of the carbon steel equipment is required adding cost and time for process deployment.

What is more, the addition of the oxygen to the injection water can cause precipitation and scaling problems depending on the composition of the injection water. Precipitation causes skin damage, which restricts the flow of fluid to and from the wellbore. Further, the introduction of oxygen to the injection water may cause generation of biomass in the surface equipment that can further restrict the water flow. Accordingly, while MEOR processes that require oxygen improves oil recovery rates from oil-bearing formations, drawbacks such as corrosion of equipment, precipitation and blockages due to biomass limit its successful field implementation.

BRIEF SUMMARY OF THE INVENTION

The current invention is directed to delivery systems and methods for MEOR that involves controlling the interactions of components of the MEOR process so that these interactions occur in the oil bearing reservoir rather than surface equipment or wellbore tubulars. For example, some aspects of the invention reduce the negative impact associated with introducing oxygen into surface equipment and wellbore tubulars by preventing contact between the oxygen and other components (equipment and/or materials) while delivering the oxygen to the reservoir where it is required for successful MEOR deployment.

Certain embodiments of the invention include a method of microbial enhanced oil recovery from an oil-bearing formation. The method includes utilizing microbes in the oil-bearing formation to enhance oil recovery. The method also includes injecting water into the oil-bearing formation via a tubing string in the wellbore. The method further includes introducing oxygen into the oil-bearing formation to support the MEOR process. The oxygen introduction includes introducing the oxygen in gaseous phase into the oil-bearing formation without having the introduced oxygen contact the walls of a tubing string and without having the introduced oxygen contact the injected water within the tubing string, during the delivery operation. Oxygen can be introduced into the system through compressed storage tanks, air compressors or pumps, venturi tubes and natural aspiration. Instead of or in addition to injecting oxygen in gaseous form into an oil-bearing formation, embodiments of the invention may involve dissolving gaseous oxygen into a fluid above the surface of the oil-bearing formation and then injecting the fluid with the dissolved oxygen, via a capillary tube into the oil-bearing formation.

Further embodiments of the invention include a method of microbial enhanced oil recovery from a wellbore in an oil-bearing formation. The method also includes injecting water into the oil-bearing formation via a tubing string in the wellbore. The method further includes introducing oxygen into the oil-bearing formation to support the MEOR process. The injected water is exposed to the introduced oxygen at the bottom of the wellbore near the formation face. The formation face is the cross sectional area of the formation that is directly in contact with the casing/cement. The formation face can act as a filter removing particles from the injection water. Thus, the formation of precipitates as a result of the injected water being exposed to the oxygen occurs outside of the near wellbore area.

Other embodiments of the current invention include a system for use in microbial enhanced oil recovery from an oil-bearing formation. The system includes a water supply system configured to supply water to a wellhead of the oil bearing formation. The system also includes a tubing string configured to transport the injection water from the wellhead to the oil-bearing formation and an oxygen supply system configured to supply gaseous oxygen for delivery to the oil-bearing formation. The system further includes a capillary tubing connected to the oxygen supply system and configured to deliver gaseous oxygen from the oxygen supply system to the oil-bearing formation, prevent the gaseous oxygen from contacting the walls of a tubing string connected to the wellhead and prevent the gaseous oxygen from contacting liquid within the tubing string during the delivery.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
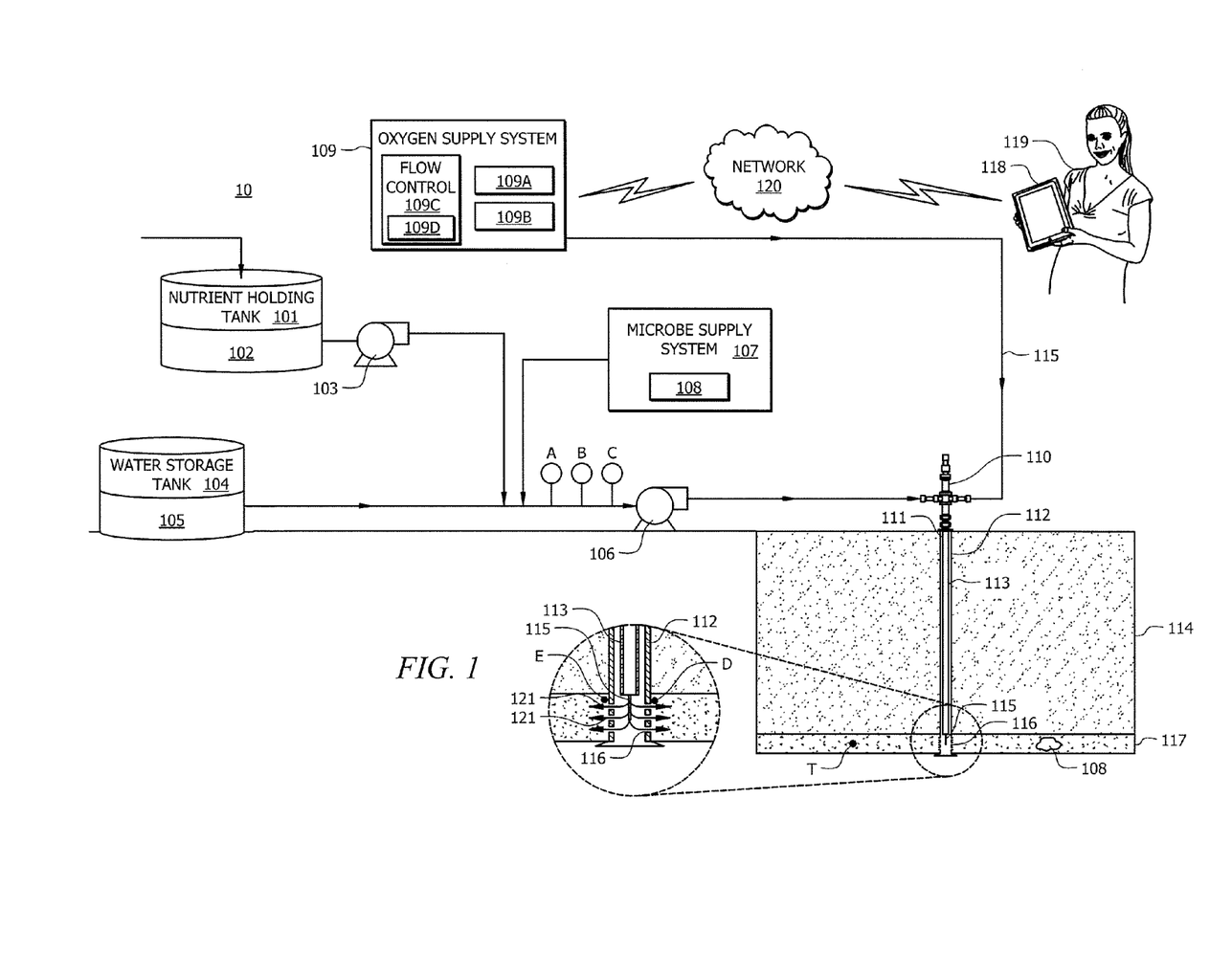
FIG. 1 shows a diagram of a system for implementing MEOR methods according to select embodiments of the invention.

FIG. 1 shows a diagram of system 10 for implementing MEOR methods according to select embodiments of the invention. FIG. 1 shows oil-bearing formation 117, which may be any type of geological formation and may be situated under overburden 114. Although oil-bearing formation 117 is shown as being onshore in FIG. 1, it should be appreciated that oil-bearing formation 117 may be located onshore or offshore. Well bore 111 is used for injecting water 105 into oil-bearing formation 117. Injected water 105 may be used for water flooding and for providing a medium for growth of microbes 108 used in MEOR. Produced water may be the source of water 105 that is used in water flooding and/or providing medium for microbial growth in oil oil-bearing formation 117. Water 105 may also be formation water that naturally occurs in a water reservoir in oil-bearing formation 117. Water 105 may also be obtained from other sources such as other formations and other bodies of water such as rivers, streams, lakes, etc. Indeed, water used in the MEOR process may be purchased, for example, from a municipal authority.

Figure 2:
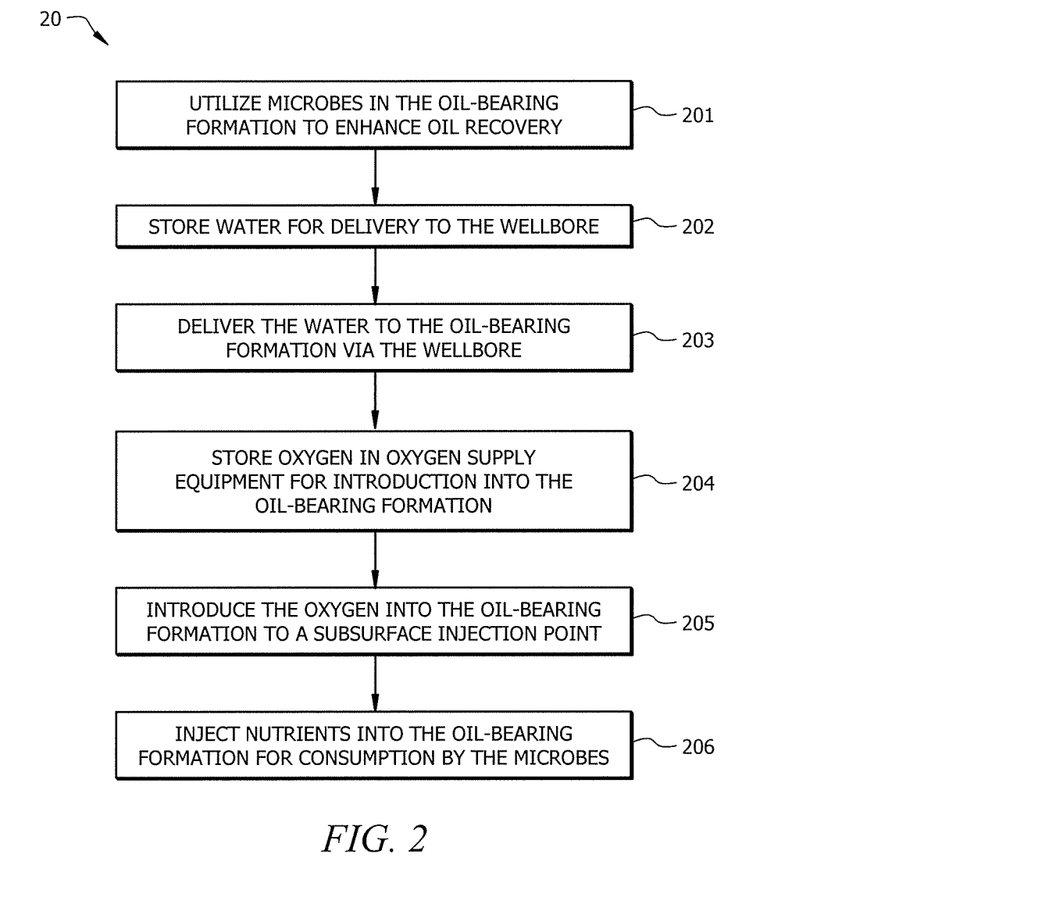
FIG. 2 is a MEOR method according to select embodiments of the invention.

FIG. 2 shows a functional block diagram according to select embodiments of the invention. Process 20 is a MEOR process that may be applied to, for example, an oil-bearing formation 117. Oil-bearing formation 117 has been subjected to primary or primary and secondary recovery. As is typical with most oil reservoirs, after primary or primary and secondary recovery has been applied to oil-bearing formation 117 a significant amount of oil remains entrapped in oil-bearing formation 117. As such, process 20 may be applied to oil-bearing formation 117 to recover oil that the primary or primary and secondary methods are unable to recover. Process 20 is a method of microbial enhanced oil recovery from wellbore 111. Wellbore 111 leads from the surface through overburden 114 into oil-bearing formation 117. As shown by step 201, method 20 involves utilizing microbes in oil-bearing formation 117 to enhance oil recovery from oil-bearing formation 117. Utilizing microbes as described herein comprises determining what microbes exist in the oil-bearing formation, determining whether these microbes can provide the microbial activity desired to recover oil and, if the identified microbes are adequate, relying on these microbes for the desired microbial activity. Utilization of microbes also comprises injecting microbes in the oil-bearing formation that are known to provide the desired microbial activity.

At step 202, water 105 is stored in water storage tank 104 for injection into oil-bearing formation 117. Usually, water storage tank 104 is a closed roof tank so as to prevent oxygen to be naturally aspirated into water 105 and thereby help to prevent corrosion of water storage tank 104 and other equipment that come in contact with water 105. Pump 106 pumps water 105 from storage tank 104, through wellbore 111, to oil-bearing formation 117 in step 203. Water 105 enters oil-bearing formation 117 through perforations 116 in casing string 112.

Microbe supply system 107 supplies microbes 108 to the MEOR process. Microbe supply apparatus 107 injects microbes on the suction side of pump 106. In some embodiments, microbe supply apparatus 107 is not a permanent installation or facility for injecting microbes 108, but rather, microbe supply apparatus 107 is a portable injection system brought to well site by truck to inject the microbes in the suction line or discharge line of pump 106. It should also be appreciated that in some embodiments of the invention, the introduction of microbes 108, and thus microbe supply apparatus 107, may not be necessary if the MEOR process relies on microbes native to oil-bearing formation 117 and these microbes are present in sufficient quantity in oil-bearing formation 117. Further, introduction of microbes 108 and microbe supply apparatus 107 may not be necessary if sufficient microbes exist in the injection water supply.

In the case where microbes 108 require oxygen for MEOR activity, it is necessary to introduce oxygen into oil-bearing formation 117 in order for the microbes 108 to survive and provide sufficient microbial activity for enhancing oil recovery. Accordingly, step 204 involves storing oxygen in oxygen supply equipment 109 for introduction into oil-bearing formation 117 and consumption by microbes 108. Embodiments of the invention comprise air supply system 109. In step 205, air supply system 109 supplies oxygen in the gaseous phase to a subsurface injection point in oil-bearing formation 117. As such, the oxygen by passes any unprotected carbon steel equipment such as storage and delivery equipment, tubular and the like.

The oxygen may be supplied as pure oxygen or oxygen mixed with other gases. For example, the oxygen may be supplied to oil-bearing formation 117 by supplying air to oil-bearing formation 117. Oxygen supply system 109 includes compressor 109A, storage holding tank 109B and flow control system 109C in embodiments of the invention. Compressor 109A compresses air into storage holding tank 109B. In storage tank 109B, the pressure of the air builds up to a level sufficient to allow injection through well head 110 via capillary tube 115. Capillary tube 115 may be made from any suitable material such as stainless steel, other metals, polymers and the like. Typically, capillary tube 115 has a cylindrical shape. That is, the cross sectional area of capillary tube 115 is usually the shape of a circle. However, the cross sectional area of capillary tube 115 may include any shape such as ellipse, polygon the like and combinations thereof. The use of capillary tubing in wellbores is known in the oilfield process art for delivering foamers, potassium chloride, fresh water and corrosion inhibitors. Capillary tubing in those applications may be used in embodiments of the invention as capillary tube 115.

The introduction of oxygen, by capillary tube 115, into oil-bearing formation 117 for consumption by microbes 108 allows the oxygen to be delivered to medium (i.e. water 105) inhabited by microbes 108 without the oxygen being dissolved in water 105 prior to injection into wellbore 111. Capillary tube 115 delivers oxygen in the gaseous phase into oil-bearing formation 117. The oxygen being delivered to oil-bearing formation 117 does not contact the walls of tubing string 113. Further, water 105 flowing from pump 106 is not exposed to the oxygen being delivered to oil-bearing formation 117, before water 105 reaches the bottom of wellbore 111 in oil-bearing formation 117. Once water 105 reaches the bottom of wellbore 111 in oil-bearing formation 117, water 105 is allowed to interface with the gaseous oxygen and the oxygen dissolves into water 105. Water 105 then flows through perforations 116 into oil-bearing formation 117 where microbes 108 consume oxygen from water 105.

Nutrients are required in oil-bearing formation 117 in addition to microbes 108. As such, step 206 involves injecting nutrients into oil-bearing formation 117. To facilitate nutrient injection into oil-bearing formation 117, system 10 includes nutrient holding tank 101 for storing nutrient 102. Nutrient 102 is stored in nutrient holding tank 101. Pump 103 pumps nutrient 102 from nutrient holding tank 101 to the MEOR process. Pump 103 is a dosing pump for supplying nutrients 102 to the MEOR process in oil-bearing formation 117 at a precise rate. Pump 103 may be a high pressure or low pressure pump depending on whether it supplies to the suction or the discharge side of injection pump 106. As shown in FIG. 1, in the current case, pump 103 is a low pressure pump because it leads into the suction side of pump 106.

Pump 106 pumps the mixture of injection water 105, nutrient 102 and microbes 108 to injection wellhead 110. The mixture of injection water 105, nutrient 102 and microbes 108 (if applicable) then flows through tubing string 113 across overburden 114, through perforations 116 located in casing string 112 and into oil-bearing formation 117.

In oil-bearing formation 117, injected microbes 108 consume the introduced oxygen (that is now dissolved in water 105 in oil-bearing formation 117), nutrients 102, carbon (usually from the oil) and thereby enhance oil recovery from oil-bearing formation 117 as described in U.S. patent application Ser. No. 13/085,308, filed Apr. 12, 2011 and entitled, "Systems and Methods of Microbial Enhanced Oil Recovery." The disclosure of U.S. patent application Ser. No. 13/085,308, published as US2012/0261117 is incorporated herein by reference in its entirety. It should be noted that recovery of oil occurs via a production well not shown in FIGS. 1, 4 and 5.

Figure 5:
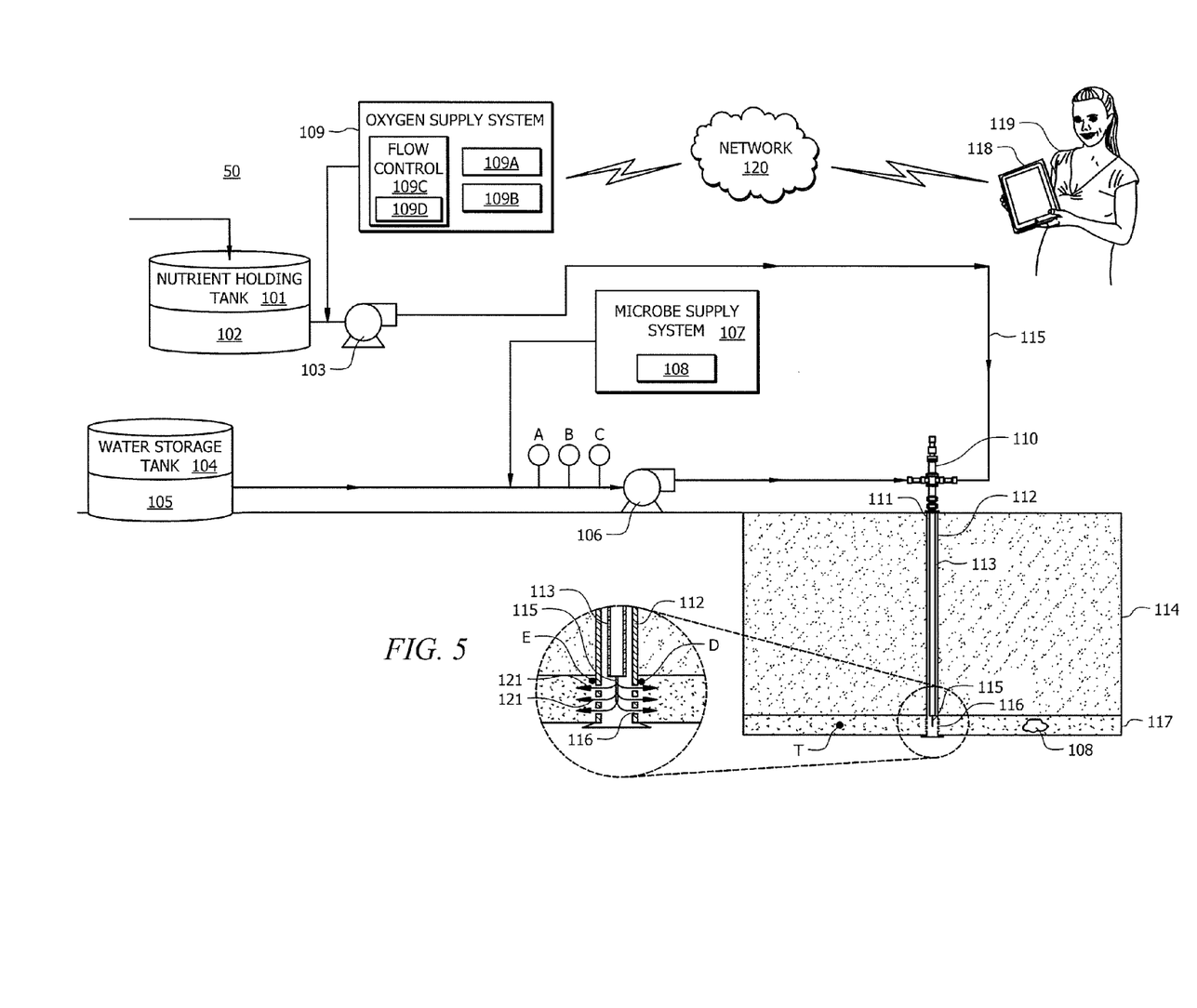
FIG. 5 shows a diagram of a system for implementing MEOR methods according to select embodiments of the invention.

Instead of or in addition to injecting oxygen in gaseous form into an oil-bearing formation, embodiments of the invention may involve dissolving gaseous oxygen into a fluid, such as water or a mixture comprising water, above the surface of the oil-bearing formation and then injecting the fluid with the dissolved oxygen, via a capillary tube into the oil-bearing formation. FIG. 5 shows one embodiment of the invention, system 50, that is configured to dissolve oxygen in nutrient 102 prior to injecting it into oil-bearing formation 117. System 50 is configured similar to system 10 except that oxygen and nutrient injection is different. In system 50, pump 103 pumps nutrient 102 from nutrient holding tank 101. Oxygen supply system injects oxygen into nutrient 102 on the suction side of pump 103. It should be noted, however, that this may also be done on the discharge side of pump 103. Pump 103 pumps nutrient 102 and dissolved oxygen through capillary tube 115 into oil-bearing formation 117.

In embodiments of the invention, a capillary tube may also be used to deliver microbes 108 to oil-bearing formation 117. One advantage of this is that contamination of microbes 108 in equipment such as storage and delivery equipment and tubular can be avoided. It should be noted that one or more capillary tubes may be used to inject nutrients, microbes and oxygen into oil-bearing formation 117. For example, in a scenario where only one capillary tube is available, microbes may be injected through the capillary tube at a different time from a nutrient and oxygen mixture. Furthermore, the capillary tube may be flushed with an appropriate fluid such as water between the injection of microbes and the nutrient and oxygen mixture.

The amount of oxygen available for microbes 108 should be controlled for optimum performance of MEOR process 201. Flow control system 109C controls the flow of oxygen or air from storage holding tank 109B through capillary tubing 112 and into oil-bearing formation 117. Flow control system 109C accurately meters the amount of oxygen flowing into oil-bearing formation 117. Controlling the precise amount of oxygen flowing into oil-bearing formation 117 is important because this may determine whether the microbes in oil-bearing formation 117 survive or not. A minimum amount of oxygen is needed to cause microbes 108 to grow, reproduce and interact with the oil in oil-bearing formation 117. On the other hand, if the oxygen flow is too high, then the environment in oil-bearing formation 117 could become toxic for microbes 108. Because of the foregoing reasons, flow control system 109C is used to keep oxygen flow. Oxygen flow, when oxygen flow is desired, is controlled in a particular range.

Flow control system 109C is capable of varying the flow of oxygen being injected into oil-bearing formation 117. The flow of oxygen into oil-bearing formation 117 may be varied based on the properties of water 105. It should be appreciated that, in embodiments of the invention where water 105 is extracted from oil-bearing formation 117, the properties of water 105 is an indication of the conditions existing in oil-bearing formation 117.

In some embodiments of the invention, flow control system 109C may be remotely controlled. For example, flow control system 109C may include a transceiver 109D for receiving instructions from remote device 118 operated by user 119. Device 118 may be a personal computer, tablet personal computer, a handheld electronic communication device and the like. Based on the instructions received from device 118/user 119, the flow of oxygen to oil-bearing formation 117 can be adjusted. In some aspects of the invention, the instructions from remote device 118 and user 119 is based on information received from flow control system 109C. This information may include readings from probes A-E. Probes A-C measure water properties and probes D and E measure temperature and pressure. In embodiments of the invention, flow control system 109C is connected to remote device 118 via a network 120 such as the Internet and communications between flow control system 109C and remote device 118 may include wired or wireless communication at different stages.

Because user 119 can remotely receive information about certain parameters regarding the MEOR process in oil-bearing formation 117, conditions undesirable for microbes 108, including undesirable levels of oxygen, may be identified quickly. If a system failure resulting in low or high oxygen supply to microbes 108 in oil-bearing formation 117 is left unnoticed for an extended period of time, the system failure might cause microbes 108 within oil-bearing formation 117 to die. In such a scenario, oil-bearing formation 117 would have to be re-inoculated and the MEOR process restarted. In sum, the ability to identify, in embodiments of the invention, whether the oxygen supply is out of specification or that there has been some other system failure, gives the operator of the well the opportunity to intervene quickly either by sending a repair crew to the field or to re-regulate the oxygen using device 118. This feature is particularly useful for wells in remote locations that are not continuously manned. It should be appreciated that instead of relying on intervention from user 119, embodiments of the invention may include oxygen system 109 or device 118 configured to automatically re regulate the air/oxygen supply to oil-bearing formation 117.

Gaseous oxygen that leaves oxygen supply apparatus 109 travels via capillary tube 115 through perforations 116 and into oil-bearing formation 117. It should be noted that the temperature and pressure in wellbore 118 may be measured by using either sensors on capillary tube 115 or other equipment installed inside casing string 112. For example, it is known that some operators run electrical cables connected to the outside of tubing string 113 on which pressure and temperature sensors are located.

In certain embodiments of the invention, nutrient 102 may be injected into oil-bearing formation 117 by a capillary tubing similar to capillary tube 115. Microbes are sometimes present in water 105, inside surface flowlines, pumping equipment and wellbore tubular (e.g. tubing string 113 and casing string 112). Exposing these microbes to nutrients and or dissolved oxygen can cause the formation biomass that can foul and plug wellbore tubular and surface equipment such as flowlines, pumps and storage equipment. Injection of nutrient 102 by capillary tubing instead of adding nutrient 102 to water 105 at the surface, prevents exposure of nutrients 102 to these microbes. It should be appreciated that these microbes are not necessarily the same as microbes 108. In such a scenario, where carbon, nutrients and oxygen are available, microbial growth and corresponding oxygen reduction processes may begin in surface equipment. Using system 10 as a specific example, if microbes 108 are exposed to nutrients 102, organic carbon and sufficient oxygen, after microbes 108 have been injected into the suction line of pump 106, then microbial growth may occur in the lines traversed by the mixture of injection water 105, nutrient 102, organic carbon, oxygen and microbes 108. Further, if the nutrients are consumed prior to reaching oil-bearing formation 117, then there may not be enough nutrients delivered to oil-bearing formation 117 for an effective MEOR process.

One way of alleviating the problems associated with microbe biomass forming in inappropriate places, according to embodiments of the invention, is to keep nutrient 102 and oxygen away from the organic carbon until the point where the organic carbon enters oil-bearing formation 117. Thus, microbial activity resulting from a mixture of microbes 108, nutrient 102 and oxygen does not cause the formation of biomass on or in tubing string 113. This may be achieved by injecting nutrient 102 and oxygen via capillary tube 115, whereby nutrient 102 and oxygen exit capillary tube 115 near perforations 116 as shown in FIG. 1.

A further benefit of injecting gaseous oxygen into oil-bearing formation 117 via capillary tube 115 is the minimization of near wellbore skin damage due to chemical precipitation caused by dissolved oxygen in water 105 in wellbore 111. Under certain conditions, injection water with dissolved oxygen precipitates $CaCO_3$ and/or $Fe_2O_3$. The kinetics for the formation of these precipitates varies as a function of ion concentrations, pH, temperature, pressure, salinity and concentration of dissolved oxygen.

Figure 3:
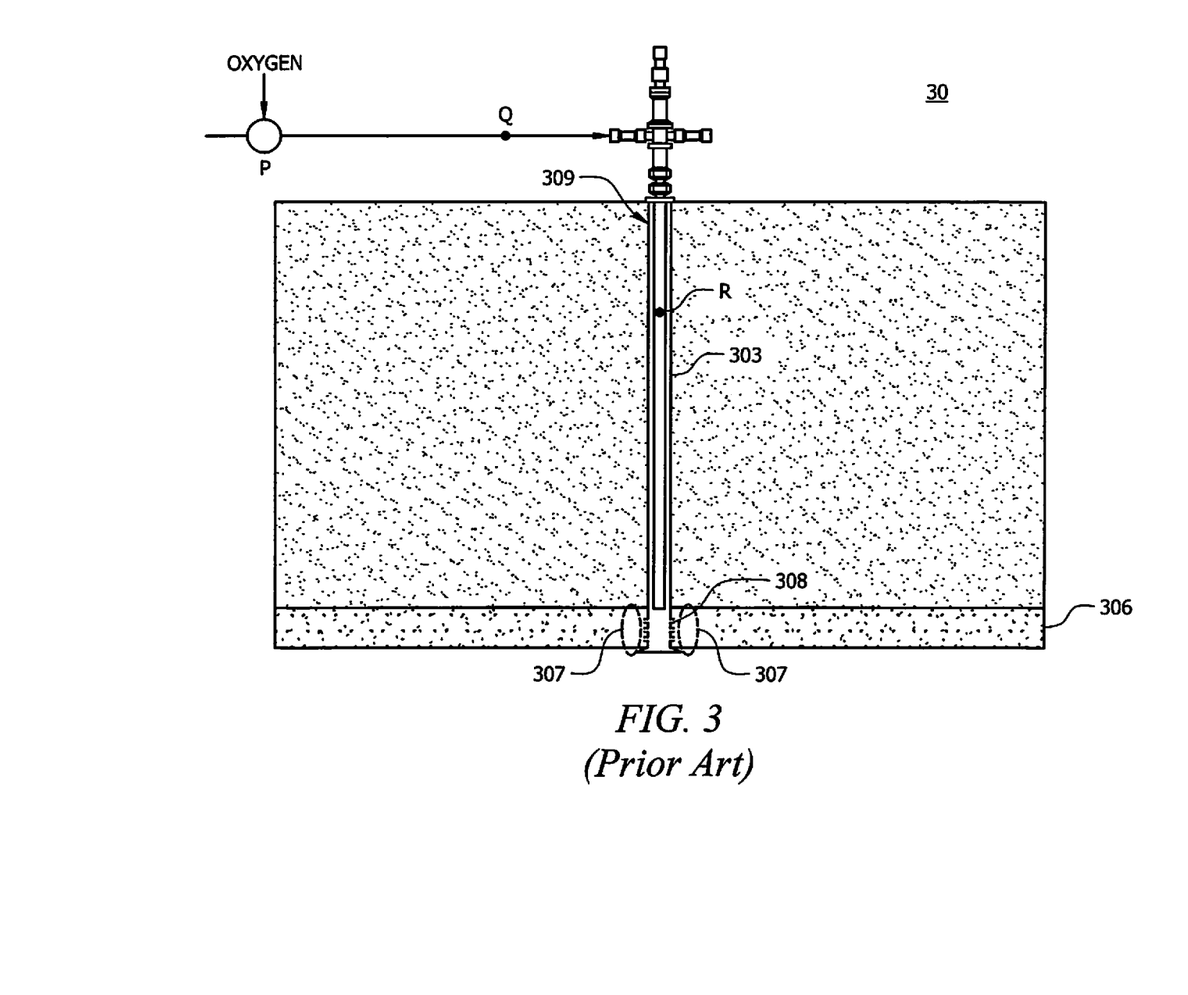
FIG. 3 is a prior art system used in current MEOR processes.

FIG. 3 illustrates a prior art well configuration 30 in which precipitates cause skin damage. Skin damage is a near wellbore reduction in permeability caused by the formation of precipitates at, for example, near wellbore area 307. Near wellbore 307 is the first few inches (1-12 inches) from casing 303 into oil-bearing formation 306. The precipitation process begins at the point where oxygen is dissolved in injection water. When oxygen is injected and dissolved in water containing iron (e.g. iron oxides and hydroxides), soluble sulfates and carbonates, the carbonates, sulfates, iron oxides and iron hydroxides can form a precipitate or scale. For example, FIG. 3 shows oxygen being added at point P. In this situation, the reaction that causes the precipitation begins at point P. But it is important to note that precipitation is not instantaneous as the oxygen is added (i.e. at point P). The kinetics of the chemical reaction and the flow rate of the injection water will dictate where the precipitation will form. The precipitate may take minutes to form and may not form until point Q or point R, depending on these factors. As the injection water flows through perforations 308, the precipitates are deposited in near wellbore area 307. Near wellbore area 307 acts like a filter that retains the precipitates. The deposited precipitates may reduce permeability near wellbore 307 and impede the flow of injection water into oil-bearing formation 306. One method of correcting skin damage is to inject acid in wellbore 309 to dissolve the deposited precipitate or scale. However, this can be an expensive exercise that involves loss of production from oil-bearing formation 306.

Embodiments of the present invention seek to prevent skin damage from happening in the first place, in part, by controlling where precipitation takes place. As shown in FIG. 1, utilization of capillary tubing allows for the subsurface injection of oxygen and/or nutrients directly to the area adjacent to perforations 116 in casing 112. Injecting the oxygen and/or nutrients into the water adjacent to perforations 116 by capillary tube 115 will minimize deposits in the near wellbore area 121 because water 105 will have traveled further into oil-bearing formation 117 away from near wellbore area 121 before the precipitates are formed. In other words, the precipitate formed and deposited further away (e.g. several feet) from well bore 111 such as at point T. Precipitates formed and deposited a few feet away from a wellbore into an oil-bearing formation is not a serious problem. The problem only exists if the precipitate foams in the first few inches of the perforations (e.g. at near wellbore area 121). The reduction in flow rate, due to skin damage, occurs because velocity of fluid is proportional to the flow rate divided by the cross-sectional area through which it flows. Skin damage severely reduces the cross-sectional area for fluid flow. As the distance from perforations 121 increase, the cross-sectional area of the flow grows exponentially and therefore it is difficult to plug wellbore 111 when the precipitate forms several feet away from perforations 116.

In sum, injecting the oxygen close to perforations 116 via capillary tube, reduces the amount of precipitation that can cause skin damage. Here, injecting the oxygen in the oil-bearing formation via capillary tubes, takes advantage of the reaction time required by the reaction that forms the precipitates. As such, the point at which the reaction is completed to form precipitates is controlled to ensure that the precipitate is not deposited where it can cause skin damage. The point and/or time at which the reaction reaches equilibrium is controlled by manipulating where and/or when the precipitation reaction begins. For example, the capillary tubes are used to control when the oxygen interfaces with injection water and thereby when the precipitation reaction begins.

Specifically, the oxygen is introduced so that the injected water is exposed to the introduced oxygen when the water is close enough to near wellbore area 121 so that the formation of precipitates as a result of the exposure occurs outside of the near wellbore area. In other words, the time between the exposure and the formation of the precipitates is more than the time required for the exposed water to flow through near wellbore area 121.

Chemical precipitation can be further minimized by employing a precipitate formation and removal unit that forms and removes precipitates from injection water prior to injecting the water into a wellbore. In embodiments of the invention, a floatation unit, such as a WEMCO™ unit, may be used as a precipitate formation and removal unit. Examples of floatation units are disclosed in "WEMCO Depurator™ System," by M. Glen Bassett, Society of Petroleum Engineers AIME, Paper No. SPE 3349, Jun 1971, which is incorporated herein by reference. Currently, floatation units are used to remove residual hydrocarbon, or some colloidal solids that may still be remaining as suspended particles in the produced water prior to either the disposal or injection of the produced water. To remove residual hydrocarbon and colloidal solids, currently, air or natural gas is injected into the produced water, which causes the colloidal particles to float to the surface and to coagulate. It also causes any dissolved oil that is still in emulsion form to coagulate, form a mass and rise to the surface where it can be skimmed off and recovered.

Figure 4:
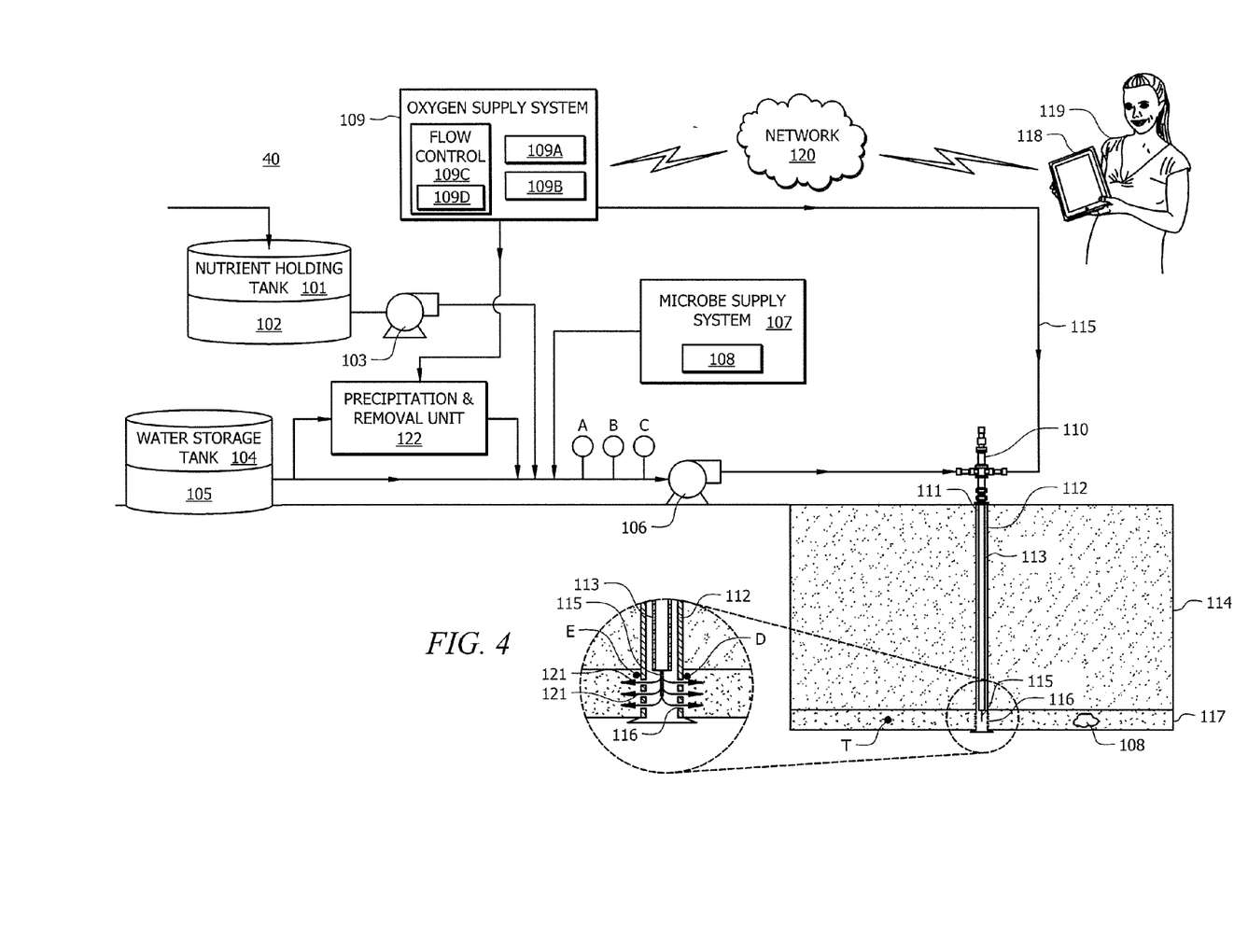
FIG. 4 shows a diagram of a system for implementing MEOR methods according to select embodiments of the invention.

In select embodiments of the invention, as illustrated, in FIG. 4, precipitation and removal unit 122 is a floatation unit used at the surface of overburden 114 to aerate water 105 and promote $CaCO_3$ and/or $Fe_2O_3$ precipitation. Once the $CaCO_3$ and/or $Fe_2O_3$ has precipitated, these precipitates are removed from water 105, for example, by filtration. The floatation unit may include a floatation vessel with a series of cells, usually four or five, through which water 105 is routed. Water 105 flows from one cell to another through a weir system at the top, and air is bubbled (or natural gas) from the bottom each of these cells. The air rises through the water column to the top. Thus, instead of the formation of precipitates that would have occurred and deposited at near wellbore area 307 as shown in FIG. 3, in system 40 of FIG. 4, near wellbore area 121 remains precipitate free because the precipitate is formed and removed in precipitation and removal unit 122. It should be noted that only the precise amount of oxygen required to cause precipitation should be added to precipitation and removal unit 122 because as discussed above, oxygen in water 105 can cause corrosion and potential formation of biomass in surface equipment. In other words, ideally, all the oxygen added to precipitation and removal unit 122 will be react in precipitation and removal unit 122. To help achieve this, flow control 109C is used to precisely control the injection of the required amount of oxygen. The amount may be based on the properties of water 105 from storage tank 104. The water properties may be determined by known techniques of water analysis.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of microbial enhanced oil recovery from a wellbore in an oil-bearing formation, said method comprising:
   storing water and delivering said water to said well bore;
   injecting water into said oil-bearing formation via a tubing string in said wellbore; and
   introducing oxygen into said oil-bearing formation for consumption by microbes in said oil-bearing formation, wherein said oxygen introduction comprises introducing said oxygen in gaseous phase into said oil-bearing formation without having said introduced oxygen contact a wall of said tubing string and without having said introduced oxygen contact said injected water when said injected water is within said tubing string, and wherein equipment for said storing and delivering does not contact said introduced oxygen.

2. The method of claim 1 wherein said microbes comprise microbes that are native to said oil-bearing formation.

3. The method of claim 1 wherein said microbes comprise microbes that have been injected into said oil-bearing formation.

4. The method of claim 1 wherein said oxygen introduction comprises injecting said oxygen via a capillary tubing running from an oxygen supply equipment to said oil-bearing formation.

5. The method of claim 4 wherein said capillary tubing is run inside said tubing string within said wellbore.

6. The method of claim 4 wherein said capillary tubing is run outside said tubing string within said wellbore.

7. The method of claim 4 wherein said capillary tubing has a cylindrical cross-sectional area that has a diameter between ¼ inch and ⅜ inch.

8. The method of claim 4 wherein said capillary tubing comprises materials selected from the list consisting of: stainless steel and polymers.

9. The method of claim 4 further comprising:
injecting microbes into said oil-bearing formation via said capillary tubing.

10. The method of claim 4 further comprising:
injecting nutrients into said oil-bearing formation via said capillary tubing.

11. The method of claim 4 wherein said capillary tubing has a cross-sectional shape selected from the list consisting of: circle, ellipse and polygon and combinations thereof.

12. The method of claim 1 further comprising:
passing said water through a precipitate formation and removal unit configured to expose said water to oxygen, prior to said injecting; and
separating, from said water, precipitates that form as a result of said exposure.

13. The method of claim 12 wherein said precipitate formation and removal unit comprises a floatation unit.

14. A method of microbial enhanced oil recovery from a wellbore in an oil-bearing formation, said method comprising:
injecting water into said oil-bearing formation via a tubing string in said wellbore; and
introducing oxygen into said oil-bearing formation for consumption by microbes in said oil-bearing formation, wherein said oxygen introduction comprises introducing a fluid comprising oxygen into said oil-bearing formation without having said introduced oxygen contact a wall of said tubing string and without having said introduced oxygen contact said injected water when said injected water is within said tubing string, wherein said oxygen introduction comprises injecting said fluid comprising oxygen via a capillary tubing into said oil-bearing formation; and
injecting nutrients into said oil-bearing formation via said capillary tubing.

15. The method of claim 14 wherein said oxygen introduction comprises
injecting microbes into said oil-bearng formation via said capillary tubing.

16. A method of microbial enhanced oil recovery from a wellbore in an oil-bearing formation, said method comprising:
injecting water into said oil-bearing formation via a tubing string in said wellbore;
introducing oxygen into said oil-bearing formation for consumption by microbes in said oil-bearing formation, wherein said injected water is exposed to said introduced oxygen when said water is in a location in relation to a near wellbore area of said wellbore such that formation of precipitates as a result of said exposure occurs outside of said near wellbore area, wherein an amount of time between said exposure and the formation of said precipitates is more than an amount of time required for said exposed water to flow through said near wellbore area.

17. The method of claim 16 wherein said microbes comprise microbes that are native to said oil-bearing formation.

18. The method of claim 16 wherein said microbes comprise microbes that have been injected into said oil-bearing formation.

19. The method of claim 16 wherein said oxygen introduction comprises injecting said oxygen via a capillary tubing running from an oxygen supply equipment to said oil-bearing formation.

20. A delivery system for microbial enhanced oil recovery from an oil-bearing formation, said system comprising:
a water supply system configured to supply water to a wellhead of said oil bearing formation;
a tubing string within a wellbore, said tubing string configured to transport said water from said wellhead to said oil-bearing formation;
an oxygen supply system configured to supply gaseous oxygen for delivery to said oil-bearing formation; and
a capillary tubing connected to said oxygen supply system, said capillary tubing configured to: deliver gaseous oxygen from said oxygen supply system to said oil-bearing formation, prevent said gaseous oxygen from contacting a wall of said tubing string, and prevent said gaseous oxygen from contacting liquid within said tubing string during said delivery.

21. The system of claim 20 wherein said oxygen supply system comprises a control system for controlling an injection rate of gaseous oxygen into said oil bearing formation.

22. The system of claim 21 wherein said control system is configured to adjust said injection rate in response to a parameter selected from the list consisting of: concentration of oxygen in water from said water supply system, organic carbon of water from said water supply system, temperature in said oil-bearing formation and pressure in said oil-bearing formation.

23. The system of claim 22 wherein said control system comprises a transmitter for transmitting information to a remote device and a receiver for receiving, from said remote device, instructions to adjust said injection rate.

24. The system of claim 23 wherein said transmitted information comprises information that is indicative of a parameter selected from the list consisting of: concentration of oxygen in water from said water supply system, organic carbon of water from said water supply system, temperature in said oil-bearing formation and pressure in said oil-bearing formation.

25. The system of claim 20 wherein said capillary tubing is run inside said tubing string.

26. The system of claim 20 wherein said capillary tubing is run outside said tubing string.

27. The system of claim 20 wherein said capillary tubing has a cross-sectional shape selected from the list consisting of: circle, ellipse and polygon.

28. The system of claim 20 wherein said capillary tubing has a cylindrical cross-sectional area and has a diameter between ¼ inch and ⅜ inch.

29. The system of claim 20 wherein said capillary tubing comprises materials selected from the list consisting of: stainless steel and polymers.

30. The system of claim 20 wherein said capillary tubing is located within said tubing string so that water flowing from said water supply system, through said tubing string, is only exposed to oxygen from said capillary tubing when said water is in a location in relation to a near wellbore area of said wellbore such that formation of precipitates as a result of said exposure occurs outside of said near wellbore area.

31. The system of claim 20 further comprising:
a precipitate formation and removal unit configured to expose said water to oxygen and separate precipitates that form as a result of said exposure.

32. The system of claim 31 wherein said precipitate formation and removal unit comprises a floatation unit.

33. A delivery system for microbial enhanced oil recovery from an oil-bearing formation, said system comprising:
a water supply system configured to supply water to a wellhead of said oil bearing formation;

a tubing string within a wellbore, said tubing string configured to transport said injection water from said wellhead to said oil-bearing formation;

an oxygen supply system configured to dissolve gaseous oxygen in a fluid while said fluid is in surface equipment; and a capillary tubing configured to deliver said fluid comprising oxygen from said surface equipment to said oil-bearing formation, prevent said oxygen from contacting the walls of said tubing string, and prevent said oxygen from contacting liquid within said tubing string during said delivery.

34. The system of claim 33 wherein said oxygen supply system comprises a control system for controlling an injection rate of gaseous oxygen into said fluid.

35. The system of claim 34 wherein said control system is configured to adjust said injection rate in response to a parameter selected from the list consisting of: concentration of oxygen in water from said water supply system, organic carbon of water from said water supply system, temperature in said oil-bearing formation and pressure in said oil-bearing formation.

* * * * *

UNITED STATES PATENT AND TRADEMARK OFFICE
CERTIFICATE OF CORRECTION

PATENT NO.         : 8,783,345 B2
APPLICATION NO.    : 13/166382
DATED              : July 22, 2014
INVENTOR(S)        : John Babcock et al.

It is certified that error appears in the above-identified patent and that said Letters Patent is hereby corrected as shown below:

In the Specification
   Column 9, line 3, delete "foams" and replace with --forms--.

In the Claims
   Column 10, claim 1, line 40, delete "injecting water" and replace with --injecting said water--.
   Column 11, claim 8, line 2, delete "materials" and replace with --a material--.
   Column 11, claim 15, line 40, delete "wherein said oxygen introduction comprises" and replace with --further comprising:--.
   Column 11, claim 15, line 42, delete "oil-bearng" and replace with --oil-bearing--.
   Column 12, claim 29, line 49, delete "materials" and replace with --a material--.

Signed and Sealed this
Seventh Day of October, 2014

Michelle K. Lee
*Deputy Director of the United States Patent and Trademark Office*